US 6,545,751 B2

(12) United States Patent
Beliveau et al.

(10) Patent No.: US 6,545,751 B2
(45) Date of Patent: Apr. 8, 2003

(54) LOW COST 2D POSITION MEASUREMENT SYSTEM AND METHOD

(75) Inventors: Sean Beliveau, Leesburg, VA (US); Edward R. Barrientos, Great Falls, VA (US); Yvan Beliveau, Blacksburg, VA (US); Thomas M. Hedges, Great Falls, VA (US); Eric J. Lundberg, Reston, VA (US); Edmund S. Pendleton, Arlington, VA (US); Timothy Pratt, Blacksburg, VA (US); Rick Slater, Reston, VA (US); Michael J. Sobel, Annandale, VA (US)

(73) Assignee: Arc Second, Inc., Dulles, VA (US)

(*) Notice: Subject to any disclaimer, the term of this patent is extended or adjusted under 35 U.S.C. 154(b) by 0 days.

(21) Appl. No.: 09/791,736

(22) Filed: Feb. 26, 2001

(65) Prior Publication Data

US 2002/0008870 A1 Jan. 24, 2002

Related U.S. Application Data

(60) Provisional application No. 60/185,379, filed on Feb. 28, 2000.

(51) Int. Cl.$^7$ .............................. G01B 11/26; G01C 3/08
(52) U.S. Cl. ..................................... 356/141.4; 356/4.08
(58) Field of Search ........................... 356/141.1, 141.4, 356/141.5, 152.1, 4.08; 702/150–153

(56) References Cited

U.S. PATENT DOCUMENTS

| | | | | |
|---|---|---|---|---|
| 4,441,809 A | * | 4/1984 | Dudley et al. | |
| 4,818,107 A | * | 4/1989 | Ono et al. | |
| 4,820,041 A | * | 4/1989 | Davidson et al. | |
| 4,874,238 A | * | 10/1989 | Ochi et al. | |
| 5,100,229 A | * | 3/1992 | Lundberg et al. | |
| 5,110,202 A | * | 5/1992 | Dornbusch et al. | |
| 5,247,487 A | * | 9/1993 | Beliveau et al. | 367/99 |
| 5,294,970 A | * | 3/1994 | Dornbusch et al. | |
| 5,307,368 A | * | 4/1994 | Hamar | |
| 5,461,473 A | * | 10/1995 | Pratt et al. | 356/141.3 |
| 5,579,102 A | * | 11/1996 | Pratt et al. | 356/3.12 |

* cited by examiner

Primary Examiner—Stephen C. Buczinski
(74) Attorney, Agent, or Firm—Steven L. Nichols; Paul W. Fish; Rader, Fishman & Grauer PLLC

(57) ABSTRACT

An improved low cost theodolite position measurement system and process which is particularly useful in enabling a single operator to conveniently set up the system and calculate elevation (el) and azimuth (az) angle data. Only a single optical transmitter is positioned within a predetermined workspace thus significantly decreasing equipment costs and setup time. The single transmitter is positioned and leveled at a predetermined point in the workspace. In operation the single rotatably mounted transmitter head illuminates the workspace volume with a pair of spaced apart precalibrated fan beams which sweep the space and a periodically emitted reference strobe pulse. At least one optical receiver is selectively positionable within said workspace so that during each revolution of said single transmitter head said receiver receives a first position strike and a second position strike of said fan beams. To determine elevation angle data, tracker logic means responsive to said receiver determines a first tie interval separation between receiving said first position strike and said second position strike and calculation means for converting said first time separation interval into an elevation angle data. To determine an azimuth angle data said receiver receives a strobe pulse and a fan beam position strike, both of which are repeatedly transmitted with a known periodicity, determining a measure of time separation related to the strobe pulse and the position strike, and converting the measure of time separation into the azimuth angle data utilizing the known periodicity.

26 Claims, 17 Drawing Sheets

$\theta = \theta_2 - \theta_1 - \theta_{offset}$

WANT TO DETERMINE θ ANGLE HERE

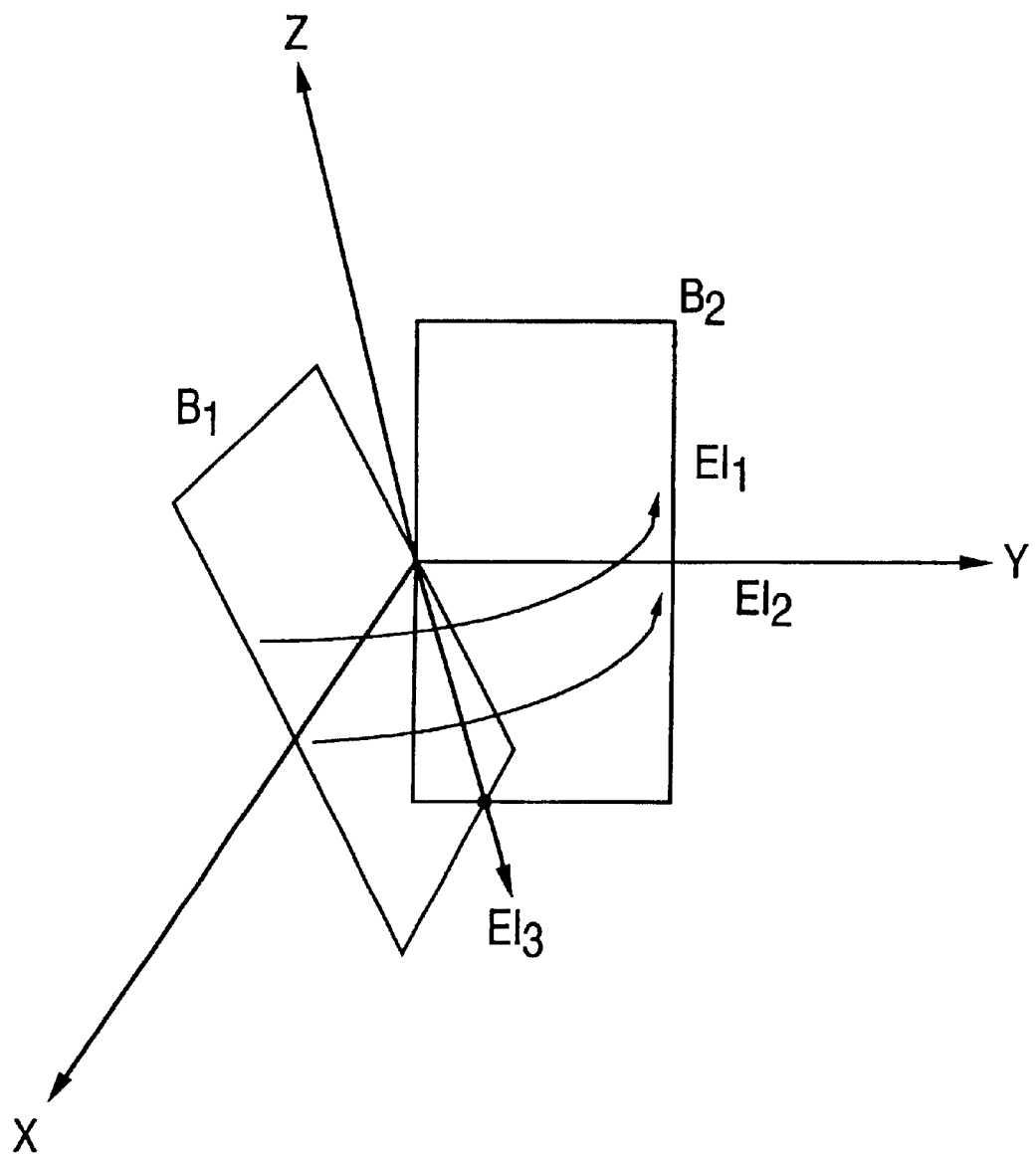

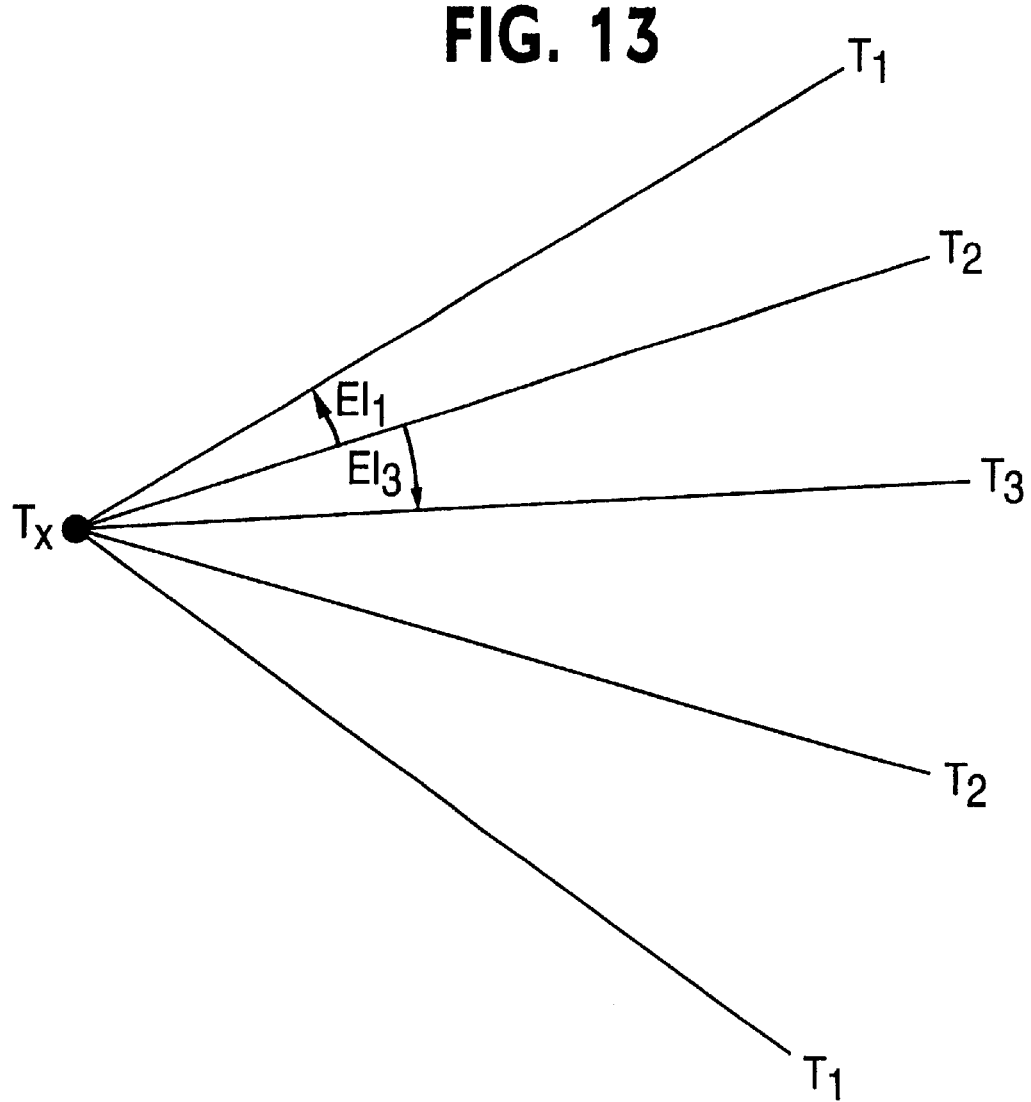

LOW COST 2D POSITION MEASUREMENT SYSTEM AND METHOD

CROSS-REFERENCE TO RELATED APPLICATIONS

This application claims priority of previously filed U.S. provisional application No. 60/185,379, assigned to the present assignee and filed on Feb. 28, 2000, which is hereby fully incorporated herein as if set forth. This application is related to the following previously filed Hedges et al. U.S. applications: U.S. Ser. No. 09/532.100; U.S. Ser. No. 09/532,099; and U.S. Ser. No. 09/532,026 all filed on Mar. 21, 2000 and to Pratt et al. U.S. Ser. No. 09/417,112 all of which relate to Precision Position Measurement Systems and Methods and all of which are of common ownership with the assignee of this application and are fully incorporated into this application by this reference.

BACKGROUND OF THE INVENTION

1. Field of the Invention

The invention relates generally to the art of precise position measurement apparatus and systems and more particularly to an improved low cost apparatus and method for generating position-related data such as azimuth and elevation of an object or point within a work area and performing calculations utilizing such data.

2. Description of the Related Art

Precise position measurement data is necessary or useful in a variety of technical fields. Obvious examples include navigation for airplanes and ships which in light of recent technical advances often include navigational aides utilizing global positioning system (GPS) data that may be overlaid on maps to facilitate navigation. Three dimensional position information and data is likewise useful in many other industrial arts including robotic control, virtual reality, augmented reality and particularly the building and construction trades.

Three dimensional positional information gathering apparatus and systems are often costly to deploy in construction type environments and often require highly skilled operators to install and operate the equipment. For example, multiple transmitters might require multiple line of sights and other setup criteria that can only be obtained using large and expensive equipment which is often not well adapted to field use. ArcSecond of Dulles, Va. manufactures and sells the improved low cost precision 3D system described in the Hedges et al. U.S. patent applications identified above. The ArcSecond Falcon system is one of the simplest and most user friendly precision 3D measurement systems and employs at least two optical transmitters, one or more selectively positionable optical receivers and sophisticated algorithms for calculating 3D data within the predetermined work area.

As will be well known to those skilled in the construction and building trades, many commercially significant tasks require precise position measurement information or data but generally do not require three dimensional data. For example, leveling a floor in the building trade requires only elevation data (one dimension), turning an angle from a corner location to mark the position of a wall requires azimuth data in a plane (two dimensions). Similarly a myriad of other such applications in the building and construction trades can be performed with combinations of elevation and azimuth data relating to a particular task. Thus a precise position measurement system that provides two dimensional data would have many practical commercial building and construction applications. However as with the 3D position measurement systems, two dimensional position measurement systems in the past have not been adapted for efficient field use. Additionally, prior art two dimensional measurement systems generally required two or more operators and were difficult to set up and maintain for field operation. Thus there has been, in applicants' opinion, a long felt need for an improved low cost spatial positioning system capable of generating precise two dimensional information and which is well adapted to efficient field setup and use.

Accordingly it is an object of the present invention to provide an improved low cost 2D position measurement apparatus and process which is both easy to set up in the field and capable of single operator utilization.

It is another object of the present invention to provide improved 2D measurement apparatus and process which is precise, rugged, reliable and easy to set up and used by a single operator under construction site conditions.

It is a further object of the present invention to provide an improved low cost robotic theodolite system and procedure for conveniently generating azimuth and elevation angle data based upon detected timing differences between illuminating laser beam strikes and a reference strobe and based upon convenient calibration data for the utilized optical transmitter.

SUMMARY OF THE INVENTION

Novel features of applicants' invention are directed to overcoming the above described deficiency in prior art precision position measurement systems by providing novel system apparatus and processes for: (i) calculating elevation angles based upon laser fan beam strikes or hits as a single rotatably mounted transmitter emits two constant laser beams from a rotating head, where selected parameters of the rotating fan beams have been precisely determined during a calibration procedure associated with the manufacture of said transmitter, and a receiver which uses a single light responsive element, (ii) further calculating azimuth angles using a single periodic reference pulse from a series of light emitting diodes, (LEDs) the reference pulse preferably generated once per revolution of the transmitter rotating head and the reference pulse being received by the same single light responsive element. In another embodiment of the present invention the improved system and process can be adapted to make distance calculations by using two receiver elements, which are positioned in the measurement field at a known distance separation, and which receive only the two rotating laser beams and the reference pulse.

BRIEF DESCRIPTION OF THE DRAWINGS

In the drawings: above described novel aspects and features of applicants' improved low cost robotic theodolite apparatus and process can be better understood with reference to the attached drawings, in which:

FIG. 12 is a graphical depiction illustrating variations caused by fan slant angles as a function of the elevation angle of an associated detector;

FIG. 13 is a vector plot illustrating various elevation angles from a transmitter for a fixed azimuth angle;

DESCRIPTION OF THE PREFERRED EMBODIMENT

Figure 1:
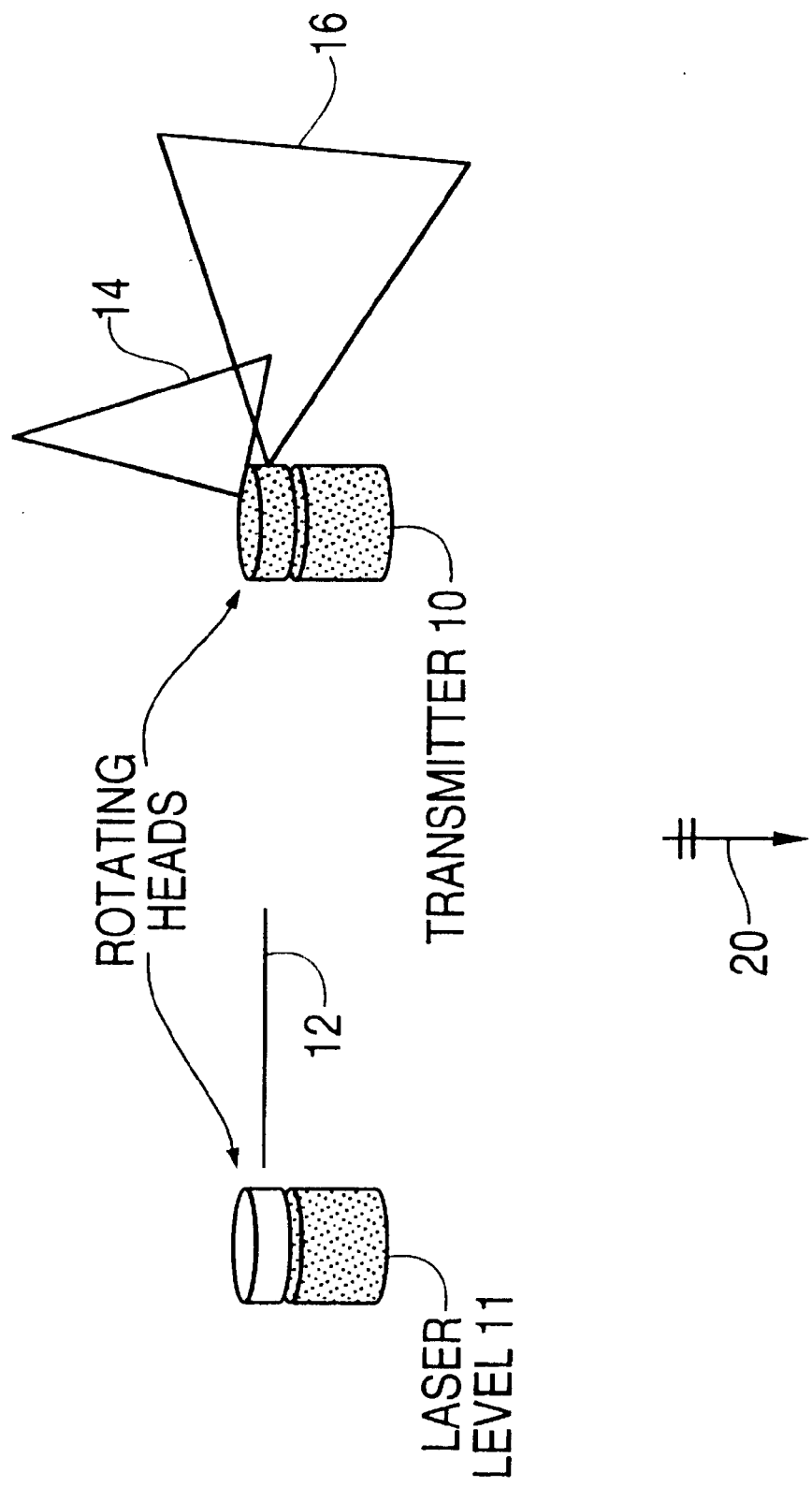
FIG. 1 is a schematic illustration of an optical transmitter and receiver utilizable in accordance with aspects of the present invention.

Referring now to FIG. 1 there is shown an ArcSecond transmitter 10 which is physically similar to a well known type rotating laser level 11 in broad use for many years. As depicted, the ArcSecond optical transmitter 10 emits two rotating fan beams 14 and 16 in contrast to the laser level 11 which emits a single rotating spot beam. The significance of applicants' choice of laser fan beams will be hereinafter described in connection with the operation of applicants' improved low cost robotic theodolite.

Figure 2:
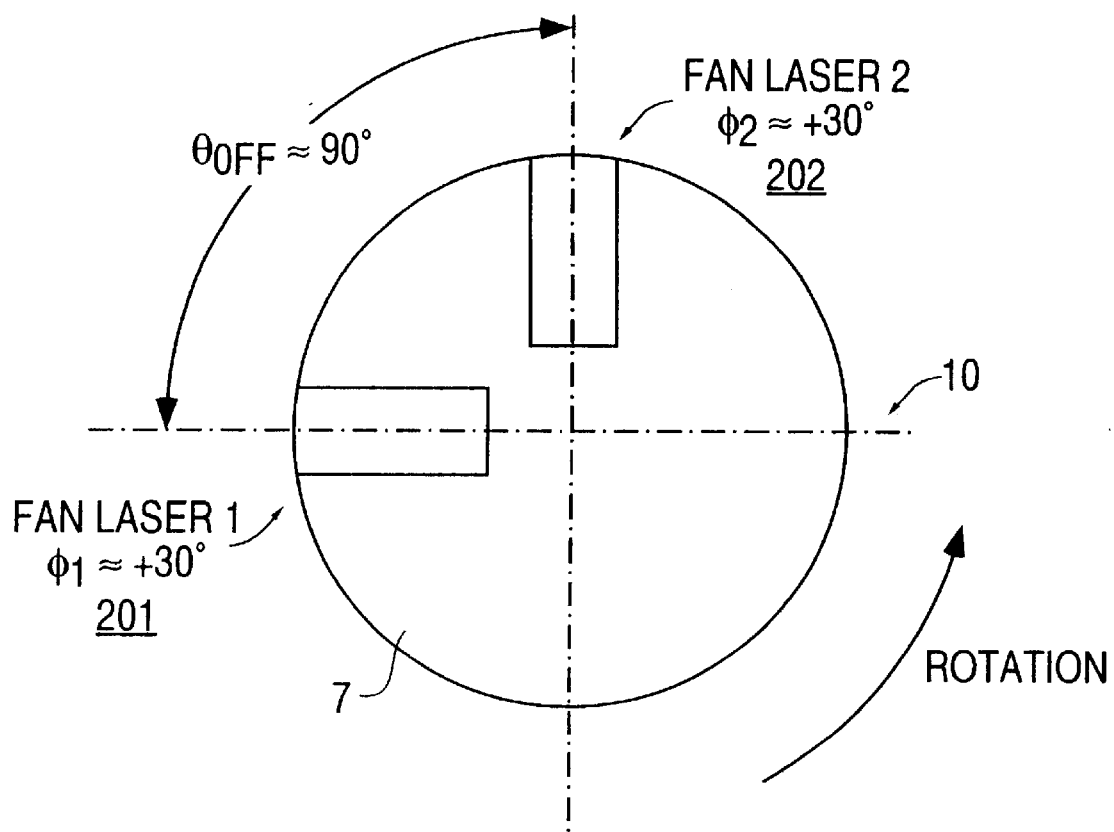
FIG. 2 is a schematic plan and sectional view of an optical transmitter utilizable in accordance with novel features of the present invention.
Figure 2A:
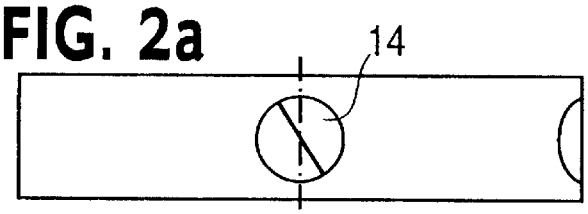
Figure 2B:
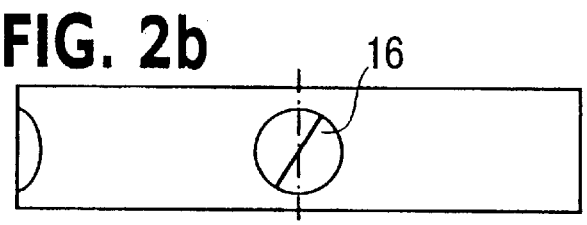

Referring now to FIG. 2 there is shown the preferred layout of the ArcSecond transmitter head 10. As indicated in the drawing and will be discussed in further detail hereinafter, there are three important angles to describe the fan beams 14 and 16 as the optical transmitter 10 rotates about its central axis. The three angles are denominated $\Phi_1$, $\Phi_2$ and $\Phi_{OFF}$, and describes the angular separation between the two laser modules in the rotating head 10 as viewed from the top. The lasers are normally spaced 90 apart and $\Phi_1$, and $\Phi_2$ describe the tilt of the fan plane of lasers 1 and 2 respectively. The two tilt angles are measured from vertical and are normally offset 30. As hereinafter will be further explained the values for these three important angles which characterize each optical transmitter uniquely are determined through a factory calibration process.

As the transmitter head 10 rotates, it scans the measurement field in a manner to be more fully described hereinafter with the two planes of light 14 and 16. In addition to this scanning operation, optical transmitter 10 fires an optical strobe, not shown, or a reference pulse at a fixed point in the transmitter head revolution. To ensure accurate position data, the azimuth reference must be very stable. There are several ways to create this transmitter shaft position index and one of the simplest and preferred technique is to use the index normally supplied with a commercially available optical encoder. In addition there are several methods known to those skilled in the art for communicating the azimuth reference of optical transmitter 10 to a receiver/detector 20. In the preferred embodiment an optical strobe flashes based upon a once-per-revolution azimuth reference coupled to the transmitter motor shaft. Thus the strobe and the pair of offset fan beams would illuminate a measurement tool or detector 20 selectively placed in the measurement field and the strobe thus provides a zero reference for the rotation of the optical transmitter 10. This series of scanning pulses and beams provides the basis for the measurement calculations to be made by a receiving unit, not shown, and will be described in more detail hereinafter.

In order to achieve high precision measurements, applicants' preferred embodiment utilizes a manufacturing process complemented with a calibration procedure to uniquely characterize or classify the fan beams of each optical transmitter with calibration data. This process is fully disclosed in Hedges et al. U.S. application Ser. No. 09/532,100 which is hereinabove referenced.

Figure 3:
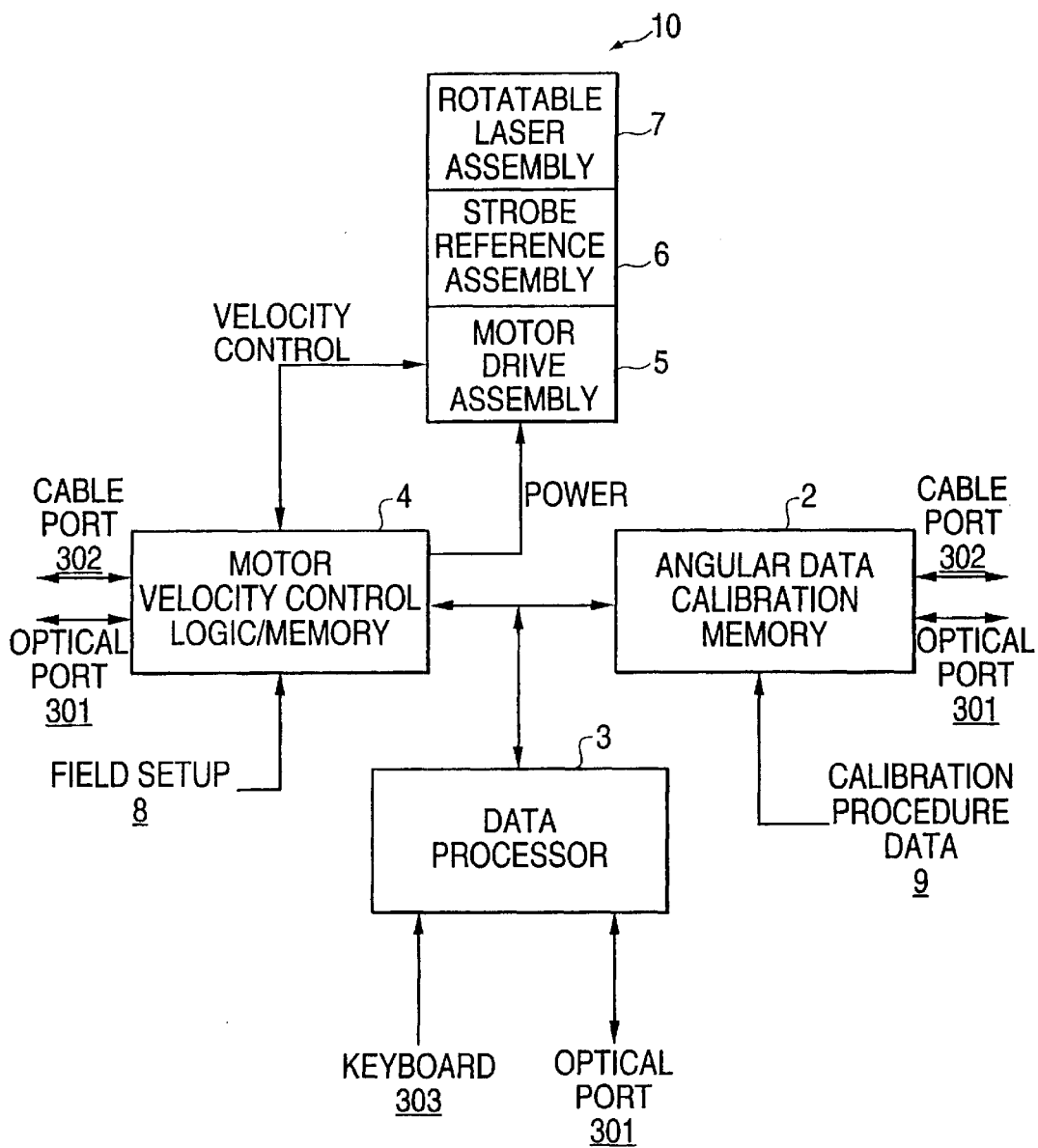
FIG. 3 is a block diagram of an optical transmitter having calibration data for uniquely characterizing the fan beams emitted by the transmitter.

Referring now to FIG. 3 there is shown a block diagram of an ArcSecond optical transmitter 10 which eliminates, as described in further detail in the referenced Hedges et al. U.S. Ser. No. 09/532,100 application, the need to employ a high cost, precision assembly process. Thus in order to simplify the mathematical processing associated with the receiver 20, the unique calibration data is utilized to define the respective angle of each transmitter's first and second radiant fan beams and the angles between the beams preferably as determined as part of the final assembly process. This angular calibration data is preferably stored in a calibration memory 2 for subsequent transfer to a receiving unit during setup operations. Further each transmitter in a position measurement system must rotate at a known and unique rate and thus calibration data regarding rotational velocity can likewise be adjusted and preloaded during the transmitter manufacturing and subsequent setup process.

Figure 4:
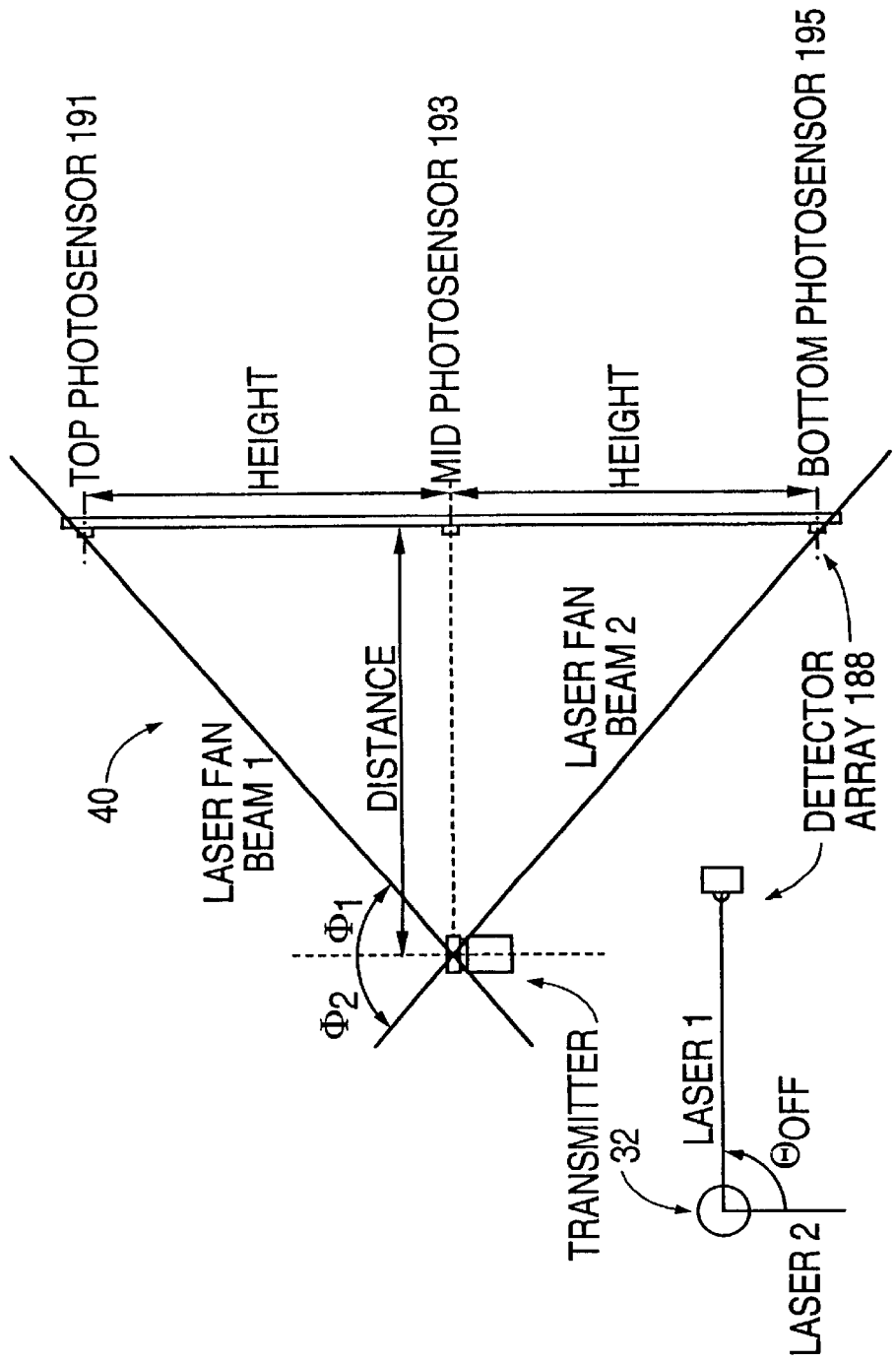
FIG. 4 is a schematic layout drawing of an optical table useful in determining unique transmitter calibration data for each optical transmitter.
Figure 5A:
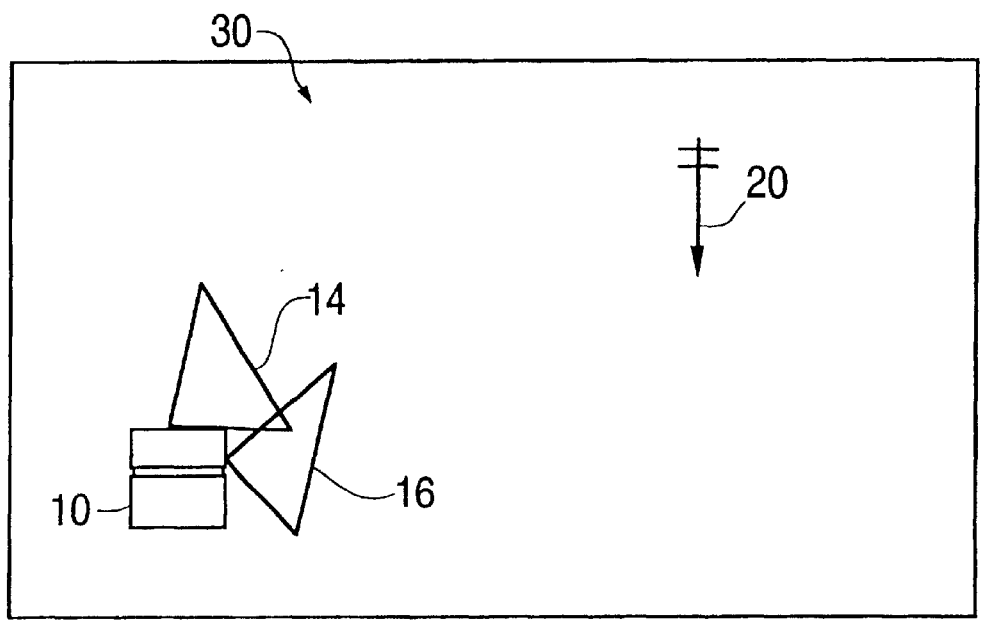
FIGS. 5a and 5b are pictorial representations of a work area layout for two embodiments of applicants' improved low cost position measurement system and method.
Figure 5B:
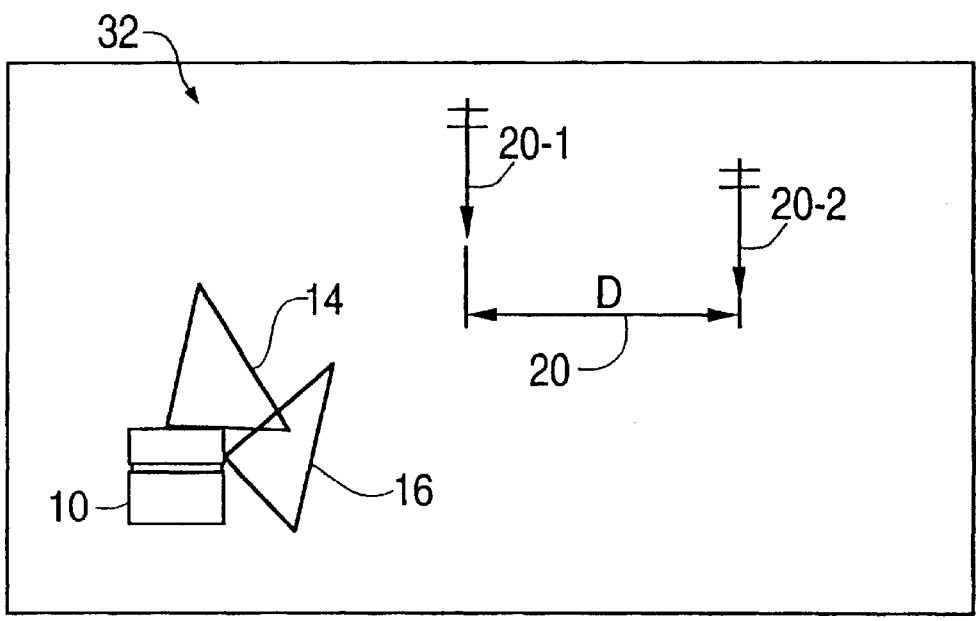

Referring now to FIG. 4 an optical transmitter calibration fixture 40 is schematically shown. As is well known to those skilled in the optical measurement arts, the best optical measurements are accomplished using optical tables. Several optical supply companies, such as Newport Corporation, have developed a reasonable substitute namely optical bars which permit building more flexible, open structures that approach the measurement properties of optical tables. As hereinabove briefly outlined the transmitter calibration process is designed to determine the following characteristics or specifications of the optical transmitter under test:

1. The speed of the optical transmitter (speed)
2. The angle of the first laser fan beam ($\Phi_1$)
3. The angle of the second laser fan beam ($\Phi_2$)
4. The angle between the beams when the transmitter is level ($\theta_{OFF}$)

Referring turntable, not shown, and the transmitter to be calibrated is mounted and aligned in the fixture using an optical level not shown. The level allows the center line of the lasers to be brought to the same level as the mid sensor detector 40. After the appropriate optical adjustments, the transmitter 10 is ready for calibration. The detector array is used to measure the time-strikes as the laser beams pass or illuminate the photo detector array. The above identified transmitter specification data can be calculated or measured from the time differences of the center point of the laser beam in relation to each other thus permitting the calculation of the desired angular measurements. For a more complete understanding of the calibration process reference may be had to the hereinabove identified Hedges et al. U.S. Ser. No. 09/532,100.

Referring which contains a rotatably mounted ArcSecond transmitter 10 and a selectively positionable light responsive detector/receiver 20. To obtain accurate position data using applicants' improved low cost single transmitter system it is necessary to create an optical plane which is level with respect to gravity. Transmitter 10 normally creates a plane that is perpendicular to the axis of shaft rotation and in this plane the time of revolution between the two laser fan beams 14 and 16 is constant and has the value theta-offset which is determined during calibration. To improve data accuracy it is necessary to adjust the transmitter so that the optical plane is also a level plane. This could be accomplished during the manufacturing process however a more efficient and cost effective approach is to employ an automatic leveling process. Those skilled in the optical measurement arts will be familiar with several leveling techniques commonly employed which consist primarily of a gimbaled apparatus that allows the transmitter to be adjusted in the field. When an auto leveling technique is employed, the calibration process hereinabove described in connection with FIG. 4 preferably would be modified to utilize two mid photo detectors which are leveled with respect to each other to gravity. In order to simplify the calibration calculations the two mid level detectors should be at slightly different ranges and angles to allow the level of the transmitter being calibrated to be determined precisely. In certain applications of applicants' improved single transmitter system it is desirable that an absolute azimuth reference be available on the transmitter 10. In that case the calibration fixture should be augmented along with the transmitter to create a fiducial, normally with the addition of an alignment pin in the bottom of the transmitter. Through use of the fiducial, the transmitter can be precisely aligned in the calibration facility which can determine the angle to the absolute encoder index. That information is then used as part of the calibration data for that transmitter and is passed on to any receiver in the system during the setup procedure.

As the transmitter head 10 rotates in operation the two fan beams 14 and 16 shown in FIG. 1 scan the measurement field 30 illuminating the detector 20 when the fan beams and hereinabove describe strobe reference pulse strike the light sensitive detector 20 sequentially. In a manner to be hereinafter fully described the detector/receiver 20 is operably associated with a computer (PCE) and a display screen not shown. In this manner the system operator as he selectively positions the detector/receiver unit 20 within the work area 30,1the PCE, as will hereinafter be described, generates the desired or selected position data. The FIG. Sb illustrates a similar work area 32 including a like optical transmitter 10 and a plurality of receiving/detector elements 20-1, 20-2 and 20-3. In accordance with this second embodiment of applicants' improved single transmitter position measurement system and method, the use of a plurality of detectors 20-1 and 20-2 and knowing the spacing D 26 between detectors 20-1 and 20-2 facilitates the calculation of distance measurements using a single transmitter system, as will hereinafter be more fully explained.

Figure 6:
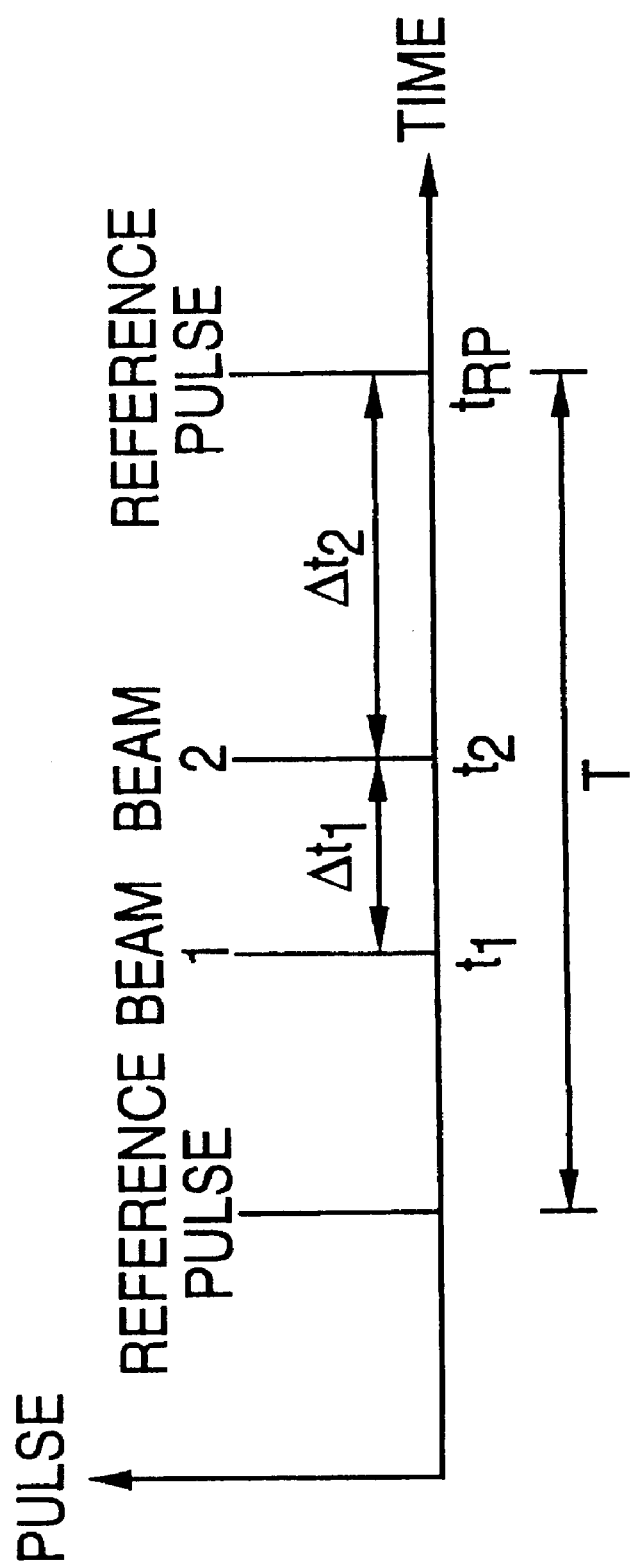
FIG. 6 is a linear time plot of the pulse sequence for pulses from an optical transmitter utilizable in accordance with aspects of the present invention.

Referring now to FIG. 6 we will now discuss how the detector/receiver 20 calculates position data based upon the hereinabove described scan angles $\Phi_1$, $\Phi_2$ for the two laser beams 14 and 16 of transmitter 10. FIG. 6 illustrates the pulse sequence as a function of time received by detector 20. FIG. 6 illustrates a typical pulse sequence for a single rotation of optical transmitter 10 wherein the time between reference or strobe pulses, as indicated by T, is the period of one revolution of transmitter 10. As hereinabove stated the reference or strobe pulse is periodically created preferably once per revolution of transmitter 10. Between each pair of reference pulses receiver/detector 20 makes two differential timing measurements, t1 and t2, for each revolution of the optical transmitter head 10 as will be hereinafter more fully explained. These timing interval measurements correspond to the times at which the light detector of the receiver is struck or illuminated by the fan beams 14 and 16.

Figure 7:
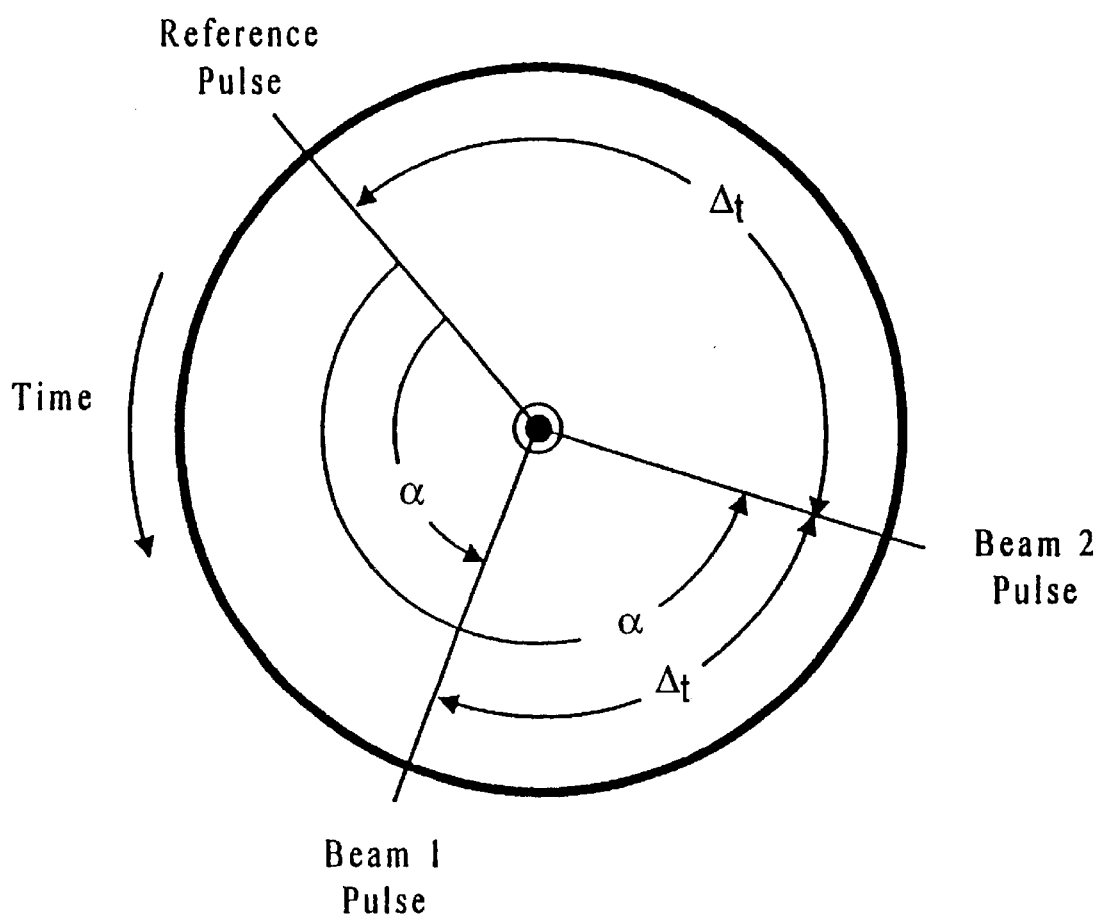
FIG. 7 is a time plot of the pulse sequence during a single rotation of an optical transmitter utilizable in accordance with the present invention.

Referring now to FIG. 7 there is shown a polar plot of the pulse sequence as received by the detector 20 during a single revolution of the optical transmitter 10. As may be seen in FIG. 7, the time differences between the receipt of pulses can be related to angular differences for one revolution of optical transmitter 10. This is accomplished by taking the pulse plot in time and viewing it as a circle of two $\pi$ radians representing one revolution of the optical transmitter 10. The two angular measurements, $\alpha_1$ and $\alpha_2$ can be defined as the angles between the optical reference pulse signal detection and the fan beam 1 and fan beam 2 detection pulses respectively. The reader is cautioned this circular representation should not be confused with the actual optical head rotation. This circular plot merely illustrates in time and angle the relative position of pulses viewed by the light detector 20.

Figure 8:
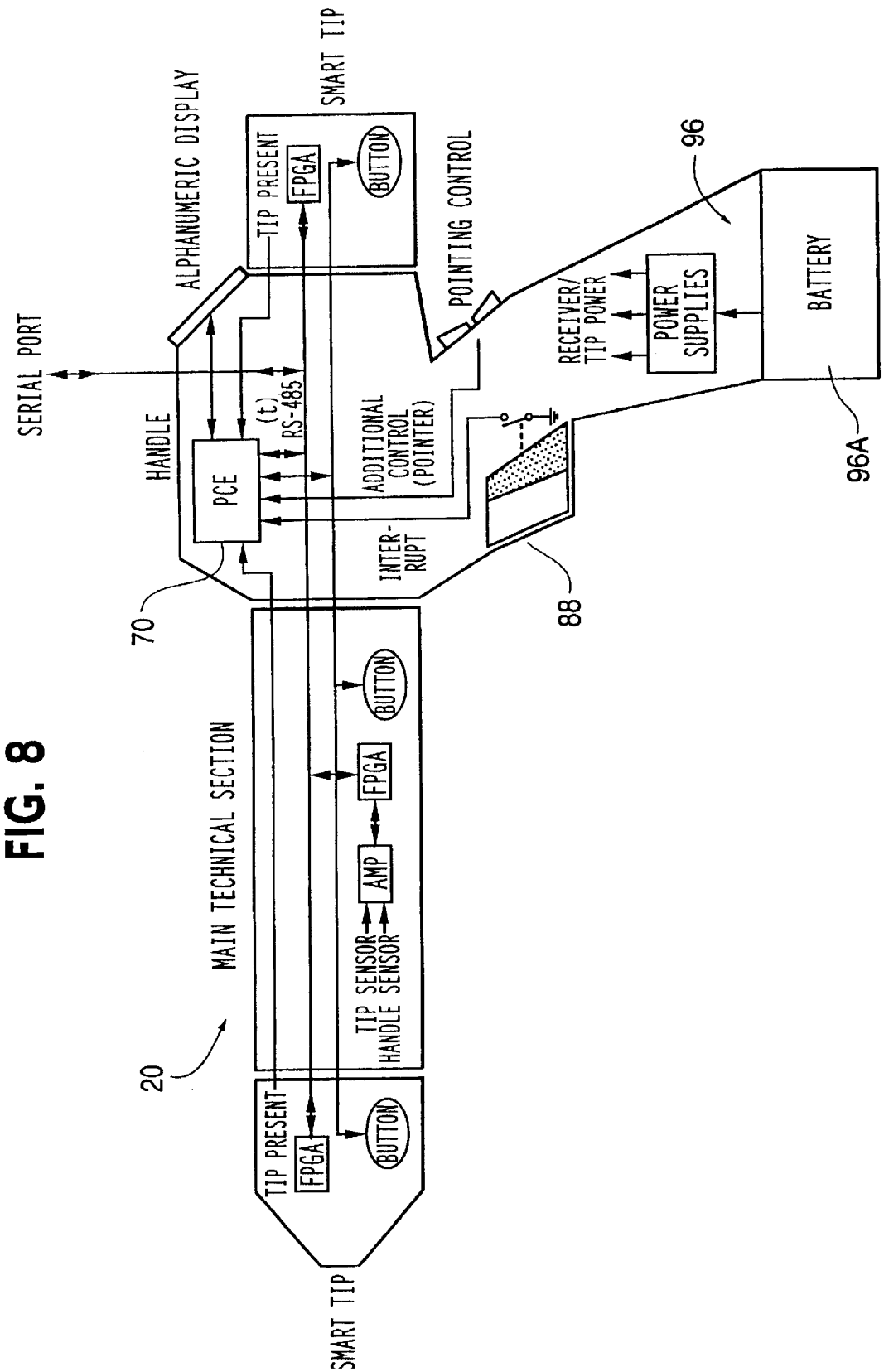
FIG. 8 is a pictorial block diagram of an optical receiver element utilizable in accordance with various features of applicants' improved position measurement system and process.

Referring now to FIG. 8 there is shown a logic block diagram of an optical receiver/detector 20, sometimes hereinafter alternatively referred to as a receiver or detector unit 200, utilizable in accordance with various aspects of applicants' improved position measurement system and process. A typical receiver/detector 20 utilizable in accordance with applicants' improvements comprises a physical hand tool or wand on which are mounted a detector measurement tip or wand associated with photodiode detection circuitry of a type well known in the optical measurement arts, a position calculation engine 70 (new PCE) which may be any Windows based computer and a user interface 72 including an alphanumeric display unit. As the user/operator, not shown, moves the selectively positionable detector/receiver 20 around the work space, the photodiode detector circuitry receives electrical impulses or strikes every time one of the planes of light of the fan beams 14 and 16 or the optical synchronization strobe reference illuminates the light detector on receiver 20. Under the control of a high speed clock preferably part of the PCE as described hereinafter, the receiver makes differential timing measurements between such received pulses and these timing measurements are then converted to respective scan angles for the two laser fan beams. As will be well understood by those skilled in the computer arts the position calculating engine 70 may utilize ones of a variety of different commercially available computer products, for example a Hewlett Packard 48 GX Processor which runs on Windows CE.

Figure 9:
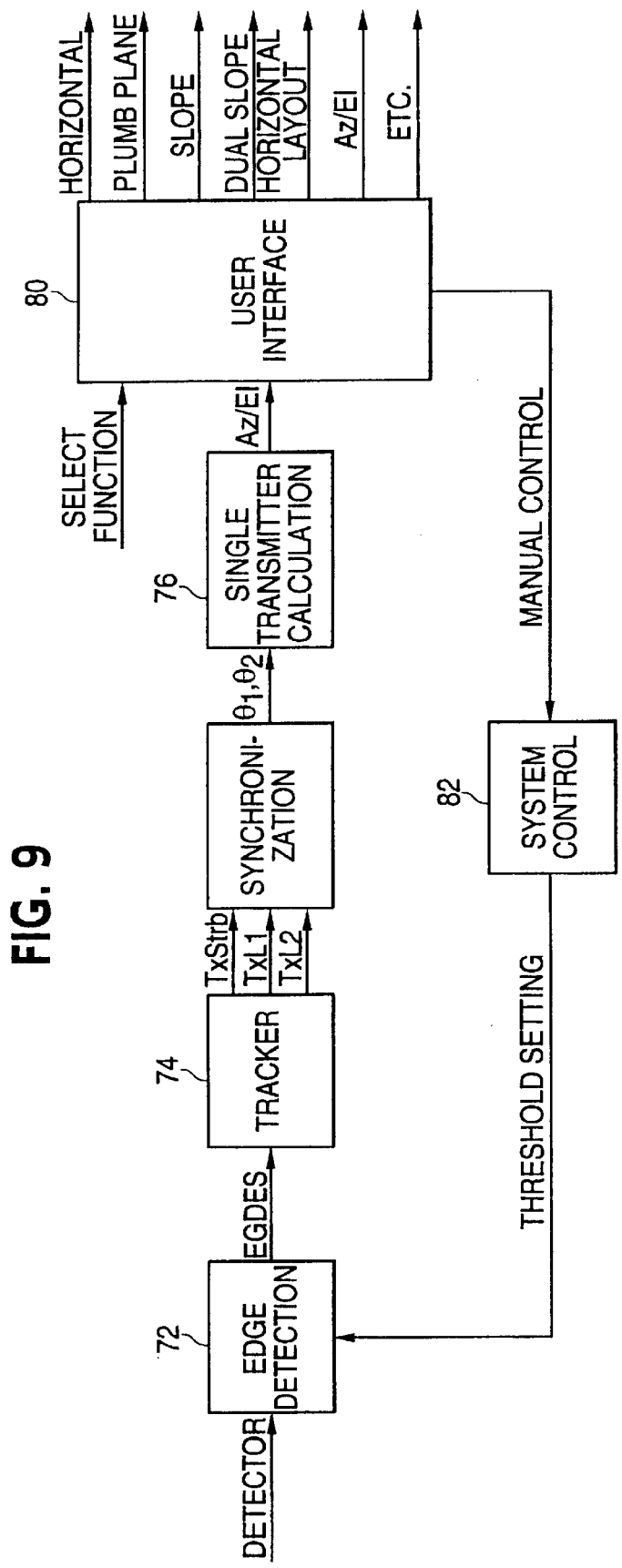
FIG. 9 is a block diagram of pulse detector tracker logic utilizable in accordance with other aspects of applicants' invention.

Referring now to FIG. 9 there is shown a schematic logic block diagram of pulse tracker and processing receiver 20 which enables the position calculation engine 70 (PCE). As will be known by those skilled in the art, various commercially available computers which have associated memory for storing firmware or other software may be utilized for translating the received or incoming pulses into position data. As hereinabove described in applicants' improved measurement system only a single optical transmitter is utilized. Therefore the task of separating pulses or sequences from different transmitters is simplified or eliminated. As will be understood by those skilled in the art, from the perspective of any one fixed location in the workplace, the transmitter 10 in applicants' system emits a periodic stream of light pulses and within one period, three pulses are emitted from said transmitter. Input from the photo detector not shown is converted to a series of impulses by the edge detector logic 72 which activates tracker logic 74. The tracker logic 74, based in part on the optical transmitter calibration data described above, separates the pulses relating to the strobe pulse, laser 1 pulse and laser 2 pulse respectively which are then synchronized under the timing control of the PCE 70. The output of the synchronization circuit provides the angular data necessary for the single transmitter calculation logic 76 to generate azimuth and elevation data which is fed to the user interface unit 80. As shown in the preferred embodiment, the user/operator may select stored firmware associated with the PCE 70 to initiate generating the various functional computations of the data thus generated, e.g. slope, dual slope, elevation angle, azimuth, etc. The operator also controls the system sensitivity by activating the system control 82 to set the desired threshold setting to eliminate extraneous noise, spurious signals, etc.

Figure 10:
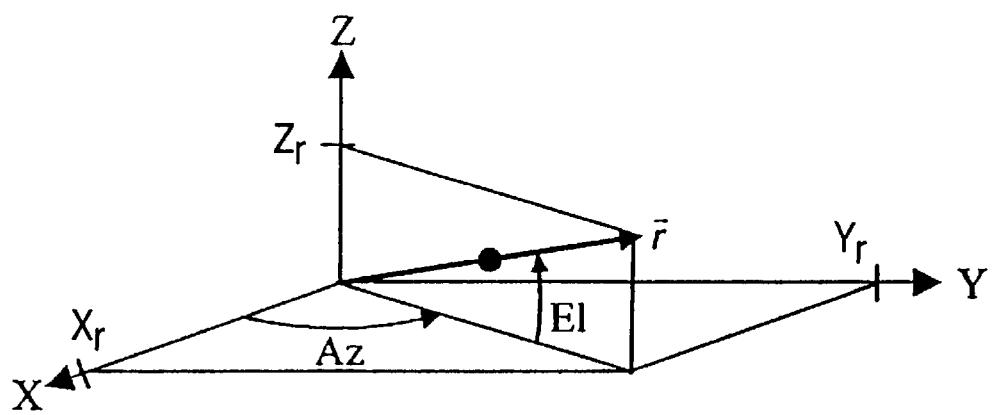
FIG. 10 is a Cartesian plot of vectors useful in defining azimuth and elevation calculation processes in accordance with aspects of the present invention.

Referring now to FIG. 10 there is shown a Cartesian plot of vector "r" which is useful in defining the terms elevation (el) and azimuth (az) in accordance with various aspects of applicants' improved position measurement system. FIG. 10, illustrates the meaning of the terms "elevation" and "azimuth" using a standard three dimensional coordinate system. The az-el pair uniquely defines only the direction of vector r and therefore only by further specifying the distance from the origin o to the point of interest r can the point r be uniquely positioned in three dimensions. Stated another way, any point along vector r has the same azimuth and elevation. As will be fully understood by those skilled in the mathematical and computational arts, with reference to FIG. 10 the quantities for elevation (el) and azimuth (az) may be mathematically defined and expressed as follows:

$$el = \tan^{-1}\left(\frac{z_r}{\sqrt{x_r^2 + y_r^2}}\right) \quad az = \tan^{-1}\left(\frac{y_r}{x_r}\right)$$

Figure 11A:
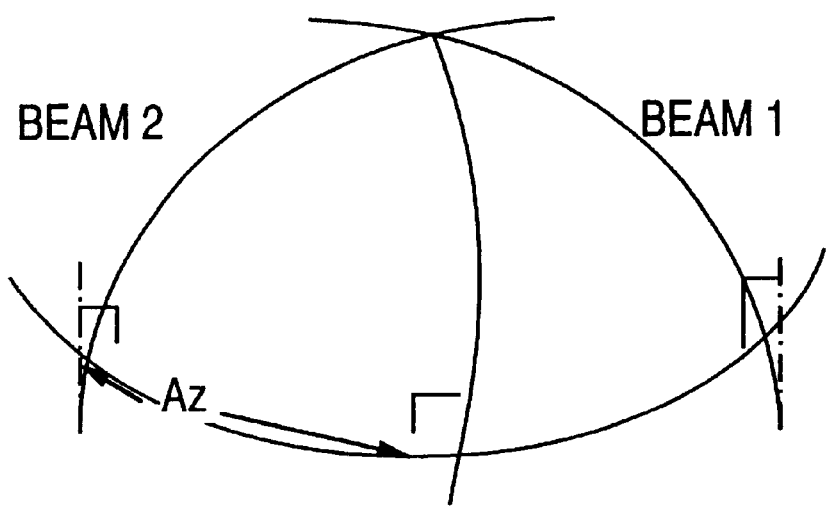
FIGS. 11a–d is a series of spherical/triangular drawings useful in depicting the mathematical derivation of applicants' Az/El model.
Figure 11B:
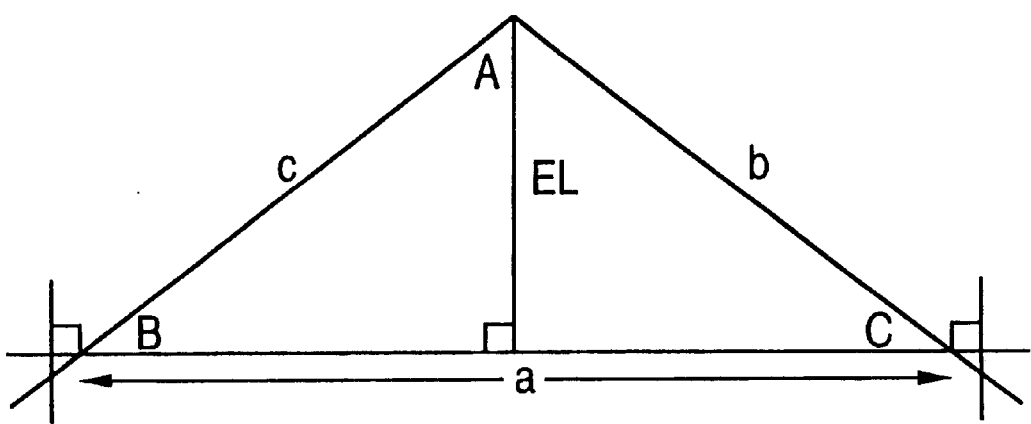

Referring now to FIGS. 11a through 11d, there is shown a series of spatial drawings and related triangular rearrangements for ease of inspection. In general the use of spherical trigonometry to depict and thus facilitate derivation of desired mathematical relationships are useful in defining a generalized elevation/azimuth mathematical model. FIGS. 11a and 11b illustrate the fan beams 14 and 16 of optical transmitter 10 on the surface of a generalized sphere. Through the application of the well known law of cosines, the law of sines and the law of spherical triangles, a series of mathematical equations may be derived in terms of trigonometric functions for angles $\Phi_1$, $\Phi_2$ and $\theta_{OFF}$. Similarly with reference to FIGS. 11c and 11d utilizing beam 1, a mathematical expression for azimuth may be likewise derived as herein below demonstrated.

Derivation of Az/El Model

Azimuth and Elevation can be calculated using spherical trigonometry. Imagine beams on the surface of a sphere as shown in FIG. 11a. Redrawing (FIG. 11b) for ease in visualization allows us to state through inspection:
1. Law of Cosines: cos A=−cos B cos C+sin C cos a
2. Right Spherical Triangle: sin EL=sin B sin c
3. Law of Sines:

$$\frac{\sin c}{\sin C} = \frac{\sin a}{\sin A} \Rightarrow \sin c = \frac{\sin a \sin c}{\sin A}$$

Substituting 3 → 2

$$\sin EL = \frac{\sin B \sin a \sin C}{\sin A}$$

Using $\sin^2 A + \cos^2 A = 1$, #1 becomes $$\sin A = \sqrt{1 - (\cos B \cos C + \sin B \sin C \cos a)^2}$$

Substituting 5 → 4

$$\sin EL = \frac{\sin B \sin a \sin C}{\left(\sqrt{1 - (-\cos B \cos C + \sin B \sin C \cos a)}\right)^2}$$

Figure 11C:
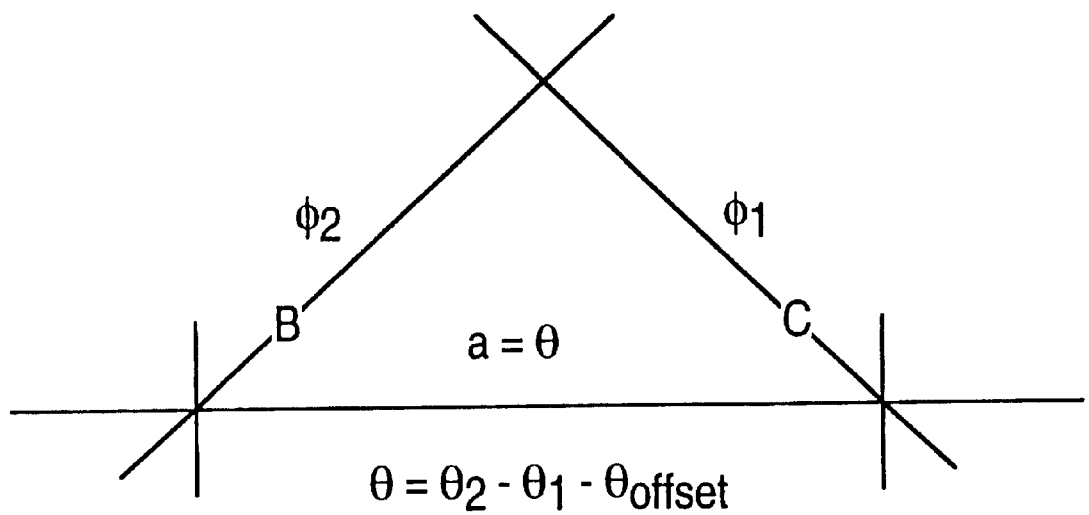
Figure 11D:
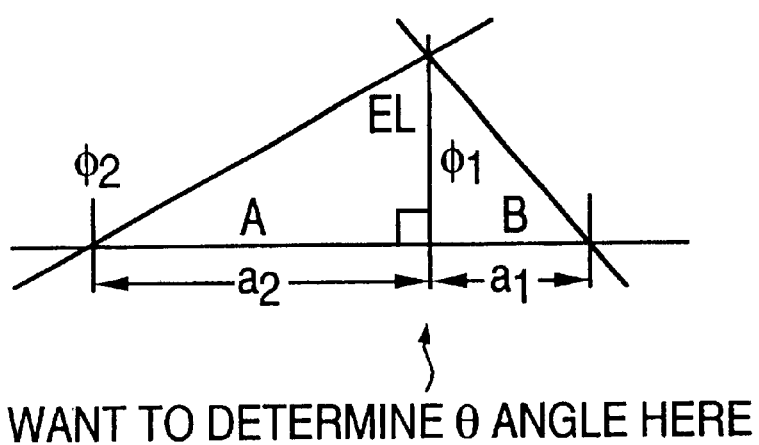

Returning to the triangle as shown in FIG. 11c:

$B = 90 - (-\varphi_2) = 90 + \varphi_2$ $\sin B = \sin(90 + \varphi_2) = \cos\varphi_2$ $\cos B = \cos(90 + \varphi_2) = -\sin\varphi_2$ $C = 90 - \varphi_1$ $\sin C = \sin(90 - \varphi_1) = \cos\varphi_1$ $\cos C = \cos(90 - \varphi_1) = \sin\varphi_1$ Therefore, $$\sin EL = \frac{\cos\phi_1 \cos\phi_2 \sin\theta}{\sqrt{1 - (\sin\phi_1 \sin\phi_2 + \cos\phi_1 \cos\phi_2 \cos\theta)^2}}$$

and EL is the inverse sin of the right side of the equation. For azimuth (referring to FIG. 11d:

From Beam 1:

$\sin a_1 = \tan EL \cot B$ $B = 90 - \phi_1 \Rightarrow \cot(90 - \phi_1) = \tan\phi_1$ $\sin a_1 = \tan EL \tan\phi_1$ $Az_1 = \theta_1 a_1$ $Az_1 = \theta_1 - \sin^{-1}(\tan EL \tan\phi_1)$ From Beam 2:

$\sin a_2 = \tan EL \cot B$ $B = 90 - \phi_2 \Rightarrow \cot(90 - \phi_2) = -\tan\phi_2$ $\sin a_2 = -\tan EL \tan\phi_2$ $\sin(-a_2) = \tan EL \tan\varepsilon_2$ $Az_2 = \theta_2 + a_2$ $Az_2 = \theta_2 - \sin^{-1}(\tan EL \tan\phi_2)$ Therefore, $$Az = \frac{Az_1 + Az_2}{2}$$

With specific reference to FIG. 5a and 5b, 9, 10, 14 and 16, the flexible structure and versatility of applicants' improved low cost position measurement system and process will be further explained with reference to specific tasks or applications applicable in the construction industry, e.g. measuring elevation, determining azimuth, turning an angle or leveling a floor.

System Operation

In operation of the transmitter 10 and a receiver 20, to produce position information, will now be described.

1. Set-up of the Transmitter

The transmitter 10 must be positioned and set-up before any position information can be calculated. The desire is to position the transmitter 10 over a point of interest, for example the location of a corner of a floor or wall. First the transmitter 10 must be leveled and then it is moved in the xy plane (with z being parallel to gravity) until it is over the point of interest. In the preferred embodiment, the transmitter is self-leveling and includes an optical plummet. As previously mentioned, the optical plummet in transmitter 10 involves a laser aligned to the spin axis of the transmitter. The laser shoots down a laser beam to the ground. To position the transmitter, the user simply moves the transmitter in the xy plane until the laser is coincident with the point of interest.

If azimuth measurements are to be made, the transmitter 10 can then be backsighted to establish a reference angle against which additional azimuth angles can be measured. As explained below, the reference azimuth angle of the transmitter can be defined as the average of where the two fan beams are when the strobe pulse is generated. Because the strobe pulse fires once per revolution of the rotating laser head 10, the two fan beams (and therefore the reference angle) should always be in the same location.

2. Determining Elevation

In order to measure the elevation angle of a particular point, the receiver 20 must be placed so that one of the detectors 20-1, or some defined point above or below them is at the point to be measured. Notably, in order to measure elevation, only one detector 20 is needed, and the transmitter 10 need not emit a strobe pulse. The receiver 20 only needs to receive the two fan beams at the detector 20.

The elevation is calculated by measuring the time between the arrival of the two fan beams at the detector 201. Several techniques are available for determining the elevation using the timing information and the transmitter calibration information (phi1, phi2 and Theta-offset). Assuming that the transmitter is level, the elevation can either be found through table look-up or through an analytic algorithm such as described in section Derivation of Az/El Model. These steps are further explained below.

Because the fan beams have different slant angles, as described earlier, the time between their arrival at detector 20 will vary depending on the elevation angle of the detector 20. This can be seen by referring to FIG. 12, which shows two planes $B_1$, $B_2$ which correspond to the planes of two beams. Strictly speaking, the fan beams do not have fan angles of one-hundred eighty degrees, so the "planes" should be shaped like pie-shaped wedges coming from the origin. Also, the fan beams have some non-zero beam width, so the "planes" should be getting thicker as they move from the origin. Putting these informalities aside, one can see that the time between the arrival of the two planes $B_1$, $B_2$ varies depending on the elevation angle.

Each point on each of the planes $B_1$, $B_2$ has a constant angular speed, covering 360 degrees once in the fixed amount of time it takes to complete one revolution. It follows that the time between the arrival of a point on plane $B_1$ and a point on plane $B_2$, at the same z-coordinate, is directly related to the angle separating the two points. At elevation angle $E1_1$, the two planes $B_1$, $B_2$ are separated by greater than 90 degrees. At elevation angle $E1_2$, the two planes are separated by exactly 90 degrees. And at elevation angle $E1_3$, the two planes intersect. The time delays at these elevation angles, therefore, have the same relationship, being largest for elevation angle $E1_1$.

This relationship is shown in the top three vectors of FIG. 13, which shows various elevation angles from a transmitter TX, for a fixed azimuth angle. $T_1$ refers to the time delay at elevation angle $E1_1$. $T_2$ refers to the time delay at the elevation angle $E1_2$. And $T_3$ refers to the time delay at elevation angle $E1_3$.

However, given that the fan beams intersect at elevation angle $E1_3$, there will be a second elevation angle with the time delay $T_1$, and a second elevation angle with the time delay $T_2$. The only difference is that a different plane $B_1$, $B_2$ arrives first.

In order to determine an elevation angle, therefore, a detector needs to measure the time delay between the arrival of the two fan beams. This will narrow the choice down to two angles. One of several techniques can be used to further identify which of the two angles is the real elevation angle.

The first technique is to restrict the angle between the two beams and the fan angle. As discussed in the section of the "Slant Angles of Fan Beams" there are optimal slant angles. As discussed, once the separation between the fans is set (say to 90 degrees) it is then possible to adjust the slant angle and the fan angle (size of the pie) to assure that the $$\text{Rel. Az.} = \pi\left(\frac{\Delta d_1 + \Delta d_2}{T}\right),$$

where Rel. Az. is the relative azimuth angle of the receiver, $\Delta d_1$ is the delay until the first fan beam reaches the receiver, $\Delta d_2$ is the delay until the second fan beam reaches the receiver, and T is the period of rotation of the rotating laser head 10.

The actual azimuth angle is then: Reference angle +Rel. Az.

Figure 15:
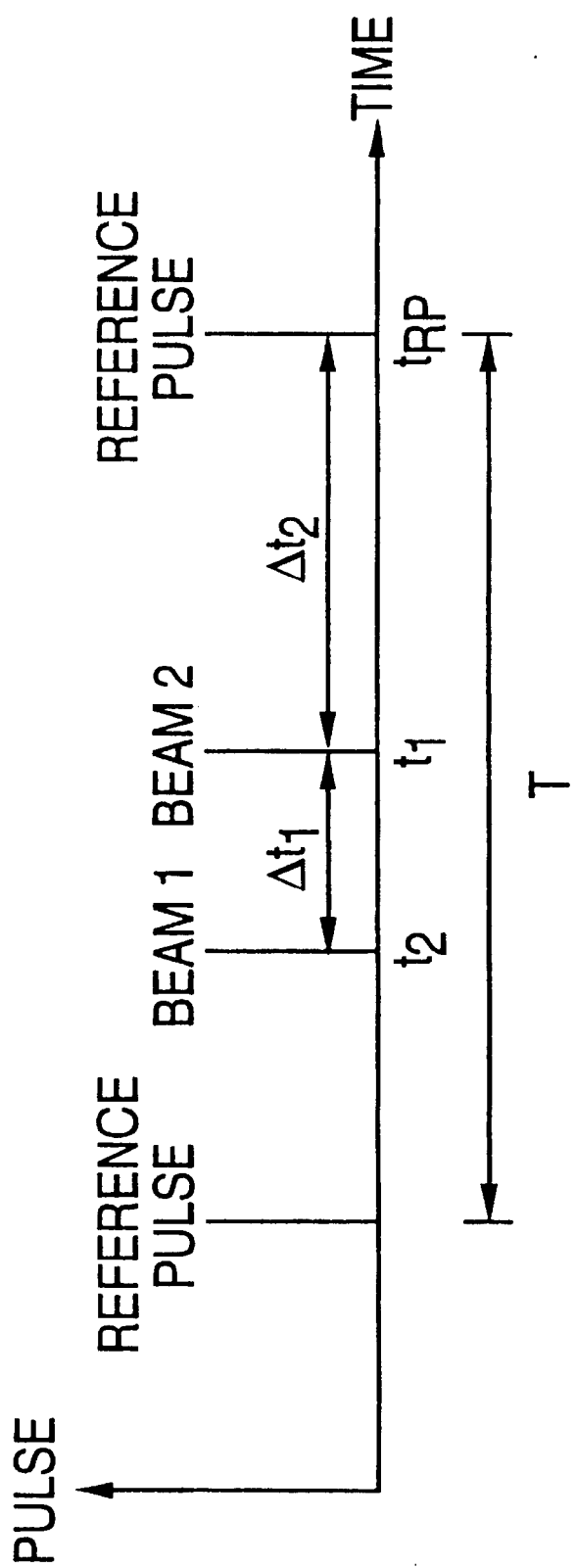
FIG. 15 is a time plot of pulse signals during a single revolution of an optical transmitter head.

Another graphical construct for performing the azimuth calculations will now be described. FIG. 15 illustrates a typical pulse sequence for a single rotation of the transmitter head 10. The time between reference pulse, as indicated by T, is the period of one transmitter head revolution. In FIG. 15, the reference pulse is the pulse created by the optical strobe. A receiver 20 can make two differential timing measurements, $\Delta t_1$ and $\Delta t_2$, for each rotation of the transmitter head 10. $\Delta t_1$ is defined as the time between the arrival of laser beam 1 and the arrival of laser beam 2. $\Delta t_2$ is defined as the time between the arrival of laser beam 2 and the next strobe pulse.

In order to relate these time differences to angular differences, we take the above plot in time and view it as a circle of $2\pi$ radians—one revolution of the trasmitter head as shown in FIG. 6.

We define two angular measurements, $\alpha_1$ and $\alpha_2$, as the angle between the optical reference pulse and laser beam 1 and laser beam 2 pulses, respectively. The reader should not confuse the circle of FIG. 6 with the actual transmitter head 10. This circle shows a plot in time and angle as viewed by the detector. Using the measured time intervals $\Delta t_1$ and $\Delta t_2$ and the fact that the transmitter 10 completes one revolution in T seconds, it is possible to calculate $\alpha_1$ and $\alpha_2$ by splitting the circle into percentages, as shown below and in FIG. 7.

Using these percentages and the fact that there are $2\pi$ radians in a single head revolution, we get the following equations for $\alpha_1$ and $\alpha_2$:

$$\alpha_1 = 2\pi\left(1 - \frac{\Delta t_1 + \Delta t_2}{T}\right)$$

$$\alpha_2 = 2\pi\left(1 - \frac{\Delta t_1 + \Delta t_2}{T} + \frac{\Delta t_1}{T}\right) = 2\pi\left(1 - \frac{\Delta t_2}{T}\right)$$

Beams do not intersect. Under those conditions, an elevation ambiguity cannot exist and the analytical solution always gives the correct answer.

In the general case, there might be a need to separate the fans by say 180 degrees or to use very large fan angles, or to use very small slant angles. Under those conditions, and if only a single detector 20 is used, it can moved up or down (or closer or further from the transmitter) and the change in time delay can be used to determine if elevation angle is above or below the intersection elevation angle. If two detectors 201, 202 are used, then the values can be directly compared if the relative orientation of the detectors is known. If the two detectors 201, 202 happen to be on opposite sides of the intersection elevation angle, then more processing may need to be employed. Such processing can utilize the relationship between the time delay values received.

3. Determining Azimuth

In order to determine azimuth, one general measurement is needed. That is the time between (i) the arrival of the strobe pulse and (ii) the average of the arrivals of the two fan beams. The average of the arrivals of the two fan beams is used so as to match the method in which the reference angle was calculated in the transmitter set-up, and because it will yield a time delay which is independent of the elevation. As explained earlier, the angular speed of the fan beams is constant, therefore the time from the strobe pulse to the average of the fan beams uniquely determines a relative azimuth angle between the receiver 200 and the reference angle.

Figure 14:
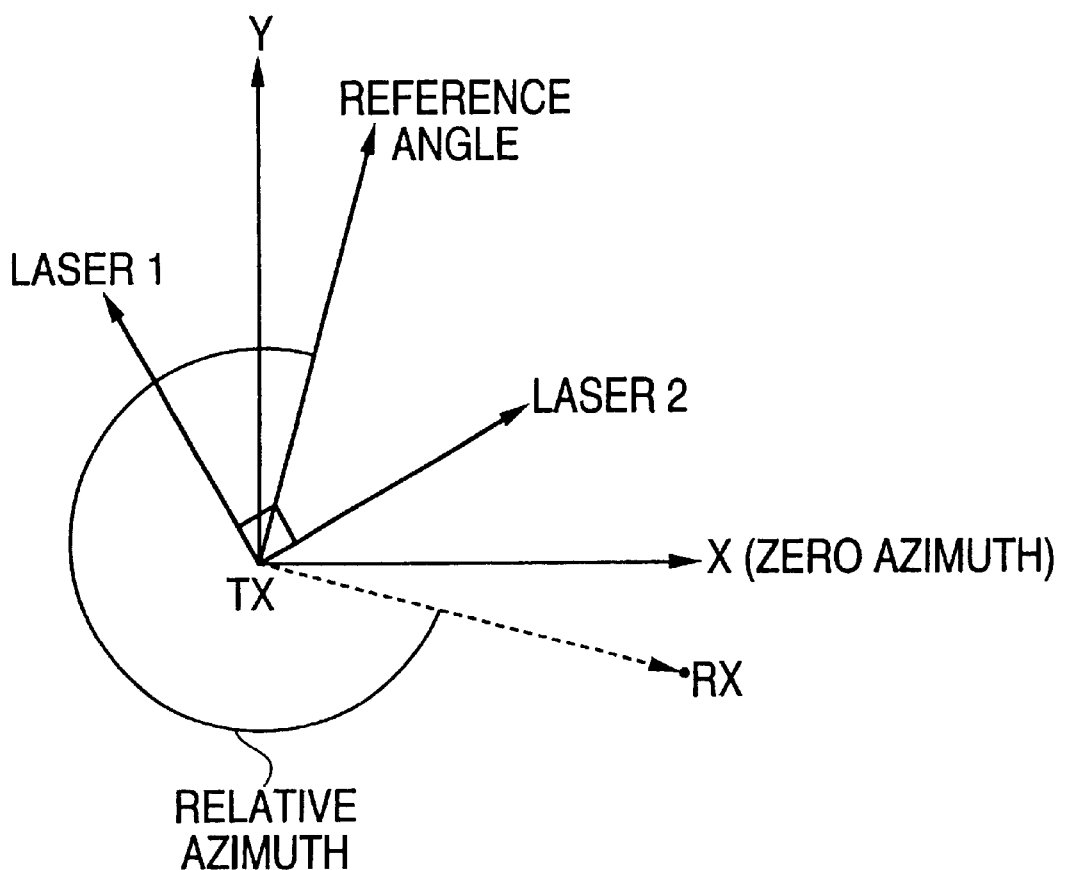
FIG. 14 is a plot illustrating an example where the zero azimuth line of a transmitter is not defined to be the reference angle.

The determine the azimuth of the receiver 20, the relative azimuth angle must be added to any offset that may exist between the reference angle and the desired zero azimuth direction. FIG. 14 shows an example in which the zero azimuth line is not defined to be the reference angle. The zero azimuth line, defined as the X axis, is chosen so that the reference angle is about 60 degrees. Laser beam 1, laser beam 2, and the reference angle are all shown at the point in the revolution when the strobe pulse is generated; therefore, the angles are accurate relative to the strobe pulse timing. The azimuth angle to the receiver RX (about 330 degrees) is equal to the relative azimuth (about 270 degrees) plus the reference angle.

The relative azimuth angle is calculated from the following equation:

Note that the reason the time intervals are measured from beam 1 rather than the reference pulse is to provide backward compatibility in the receiver software for older versions of the transmitter.

It is important to note that $\alpha_1$ and $\alpha_2$ are not exactly equivalent to the azimuth; they are merely the angles swept out by the lasers beams after the strobe pulse fires. These angles must be referenced to the zero azimuth line.

$\alpha_1$ must be adjusted by the angle marked $\theta_{RP}$, which is equal to relative azimuth of laser beam 1. $\alpha_2$ must be adjusted by an angle equal to relative azimuth of laser beam 2, which is $\theta_{RP}$ minus the separation angle between the laser beams. Both of the adjusted angles are now equal to the azimuth of the receiver. The azimuth angle can therefore be expressed in either of the following two equivalent ways:

$$Az. = \alpha_1 + \theta_{RP} = 2\pi\left(1 - \frac{\Delta t_1 + \Delta t_2}{T}\right) + \theta_{RP}$$

$$Az. = \alpha + \theta_{RP} - SeparationAngle = 2\pi\left(1 - \frac{\Delta t_2}{T}\right) + \theta_{RP} - SeparationAngle$$

As a check, we can solve for the separation angle. This reveals:

$$SeparationAngle = 2\pi\left(\frac{\Delta t_1}{T}\right),$$

which is of course correct.

It is sometimes desirable to set the point on the transmitter where the detector's azimuth will be zero. In this way, the transmitter can be lined up when it is placed in the field. This requires establishing a factory-calibrated constant indicating the difference between this point and the point that the receiver equations use to calculate the relative azimuth. In the first embodiment for performing these calculations, this relative point was the angle between the two laser beams, which was termed the reference angle. In the second embodiment for performing these calculations, this relative point was the angle of laser beam 1, which was termed $\theta_{RP}$.

4. Determining Slope

By using a single leveled transmitter it is possible to present the user with an arbitrary plane. In other words, it does not matter if the desired plane is horizontal, vertical, or at any other angle, the receiver can determine if the use is above, below, or on the desired plane. Additionally, the receiver could also be told to process multiple planes at once. Literally, the system could be set up to produce any shape that is based on a set of planes that pass through the center of the transmitter. This is an incredible capability and planes that pass through the center of the transmitter. This is an incredible capability and has tremendous advantages over other instruments in the field. For example, Laser Levels can be adjusted to create an arbitrary output. However, they can only create one plane at a time and are less accurate when in the "dial grade" mode. The reason is that all compensation techniques (whether pendulum or electronic) work best when set to a single fixed value (in most cases when the transmitter is level). Therefore, when tilted to arbitrary angles, errors creep into the compensation. The ArcSecond technique does not suffer from this disadvantage. In all cases the transmitter is in the same, accurate configuration— level—yet the system can create for the user arbitrary planes.

a. Fiding the Elevation of an Arbitrary Plane from Azimuth Only

This discussion is only concerned with a two dimensional system based on azimuth (az) and elevation (el) angles with respect to the center of the transmitter. It will assume that the transmitter is leveled and that elevation is measured with respect to the level plane (see FIG. 16). Positive elevation is above the level plane. Since we are working in only two dimensions we can imagine a measurement sphere centered about the transmitter with a radius of one unit (we don't care/know about the range). This allows us to calculate x,y,z on the sphere noting that they we will always get a unit vector (sqrt(x^2+y^2+z^2)=1).

A plane is defined by its normal expressed as either a unit vector (x,y,z) or as a pair of angles (az,el).

$$\hat{N}=Plane\_Normal=f(\hat{x}_n,\hat{y}_n,\hat{z}_n)$$

where:

$\hat{x}_n = \cos(az_n) \cdot \cos(el_n)$ $\hat{y}_n = \sin(az_n) \cdot \cos(el_n)$ $\hat{z}_n = \sin(el_n)$ In a similar fashion, a point on the surface of the measurement sphere can be expressed as either an angle pair (az,el) or as a unit vector (x,y,z)

Figure 16:
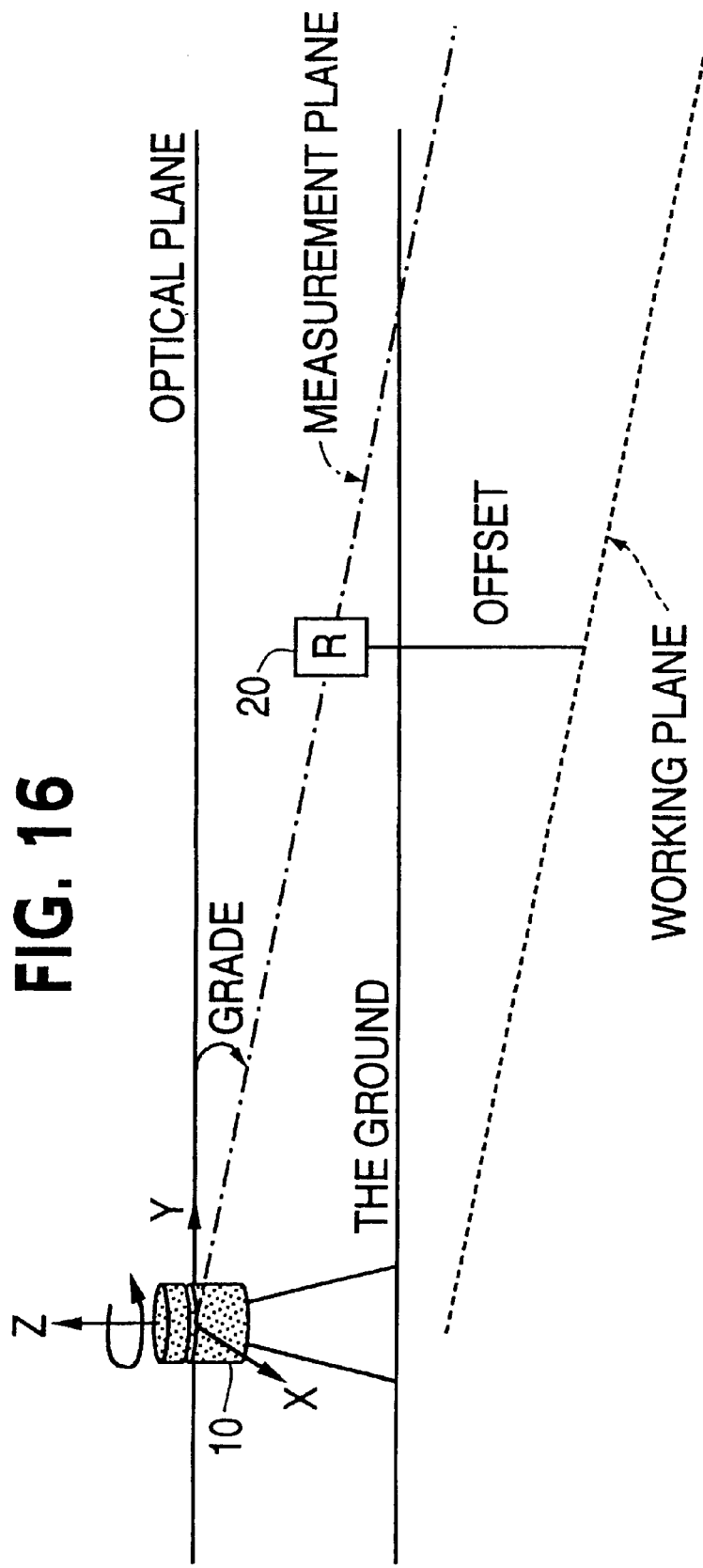
FIG. 16 is a pictorial illustration utilizing an arbitrary plane through the center of the transmitter for calculating the desired elevation above or below the reference plane.

The following discussion is with respect to FIG. 16. The above math works when the receiver is in the measurement plane. However, for most problems, the measurement plane and the working plane are separated by an offset. Any practical measurement system must find simple ways to follow the user to determine the plane and also the offset.

For example, for many problems the user can go to an azimuth where the plane can be described as a slope. An example is digging a trench. In that example, the transmitter would be in line with one end of the trench. The user could then take the receiver to the starting point for the trench. There could then be a three-step setup:

Set Azimuth and Slope—With the receiver at the start point, the computer would be commanded to (a) measure and set the azimuth and then (b) the computer would prompt the user to input the desired slope.

Set Offset—The receiver can then go into a mode to facilitate the settings of the offset. The receiver would be moved up or down until it reach the measurement plane. At that time the offset if know.

Measurement—Now the computer would be put in measurement mode and would tell the user whether he was above or below the desired elevation.

For simplicity, the above example was for a trench. However, the same technique would work for grading an entire slope. The key was to find a simple way to define the measurement plane (in the above case define a slope at a know azimuth) and then to define the offset.

Additionally, there should not be a restriction on the number of planes. Multiple planes could be defined and then the computer can jump planes based on azimuth.

5. Determining Distance

The above discussion described embodiments for determining the two-dimensional position information of elevation and azimuth. The third variable of distance, from the receiver to the transmitter, can also be determined. While not necessary for many applications, the information is useful and necessary for a great many other applications. Determining the distance can be achieved in a variety of ways. The methods described below all involve directly determining the distance at the receiver. Other technologies, like a "robotic total station," find the distance from the transmitter and then transmits that information to the receiver. Our embodiment preserves the system simplicity by not requiring an additional person to operate it, and not requiring the single operator to shuttle back and forth between the transmitter and the receiver.

a. Tape Measure

One of the simplest methods is to attach a tape measure to a point coincident with the spin axis of the transmitter (either above or below the transmitter itself). The tape measure is then carried with the receiver and the distance read off at points of interest at the same time that the receiver determines the elevation and azimuth angles. A tape measure is widely accepted as a reliable and accurate standard of measure. The tape measure can also be used to fix the distance and then rotate through an arc until the desired azimuth is found. A variety of other techniques of using a tape measure in conjunction with the embodiments described herein would be clear to those of ordinary skill in the art.

b. Stadia measurements

As described earlier, stadia measurements can also be used if two detectors, which are a known distance apart, are used. By keeping the detectors in a vertical line, and determining the elevation angles for each, the distance to each of the detectors can be calculated by known formulas. This technique, and its calculations, are relatively simple, but the accuracy is insufficient for some purposes and is less than the accuracy for the elevation and azimuth angles.

Stadia measurement can also be taken using a single detector if an elevation angle is determined, and then the detector is moved a known distance in a vertical line and another elevation angle is determined. This can be done, for example, by using a receiver with a detector which can be moved along a pole containing gradations marking off the distance. The detector is placed in a first position, an elevation angle is determined, then the detector is moved to another location and the elevation angle is determined. The distance between the two locations must be entered into the receiver in order to perform the calculations, or the receiver can even automatically move the detector a predetermined distance along the pole.

c. Electronic Distance Measurement (EDM or DISTO)

$\hat{P} = Measurement\_Point = (\hat{x}_p, \hat{y}_p, \hat{z}_p)$ where:

$\hat{x}_p = \cos(az_p) \cdot \cos(el_p)$ $\hat{y}_p = \sin(az_p) \cdot \cos(el_p)$ $\hat{z}_p = \sin(el_p)$ The measurement point "P" is in the plane if its dot product with the normal "N" is zero.

$\hat{N} \cdot \hat{P} = 0$ yields:

$\hat{x}_n \cdot \cos(az_p) \cdot \cos(el_p) + \hat{y}_n \cdot \sin(az_p) \cdot \cos(el_p) + \hat{z}_n \cdot \sin(el_p) = 0$ In practice we want to go to a particular azimuth ($az_p$) and then we want to know if we are above or below the proper elevation for a pre-specified plane. In that case the "plane normal" and the azimuth are constant in the above equation which yields:

$$A \cdot \cos(el_p) + B \cdot \cos(el_p) + C \cdot \sin(el_p) = 0$$

where:

$$A = \hat{x}_n \cdot \cos(az_p)$$

$$B = \hat{y}_n \cdot \sin(az_p)$$

$$C = \hat{z}_n$$

recording_gives:

$$\frac{A+B}{C} = \frac{\sin(el_p)}{\cos(el_p)} = \tan(el_p)$$

yields:

$$el_p = \tan^{-1}\left(\frac{A+B}{C}\right)$$

This is the required equation. Given an arbitrary plane through the center of the transmitter, we can calculate the desired elevation for that plane at each azimuth. Since we can calculate the desired elevation, we can also calculate whether we are above or below that desired elevation.

b. Practical Consideration

Yet another method of determining distance involves integrating into the receiver a distance finding device, such as a laser range finder. The laser range finder, such as the Disto described earlier, emits a laser which bounces off of the transmitter. The reflections are detected by the laser range finder and the distance is calculated. Standard phase or time measurement can be used. The accuracy of such devices is typically greater than that of stadia measurements.

Electronic distance measurements ("EDM") devices are a class of laser range finders with good accuracy, generally down to one millimeter. This is achieved in part by utilizing a prism for the reflections. In general, a laser range finder can reflect the laser off of any surface, but a prism provides greater distance accuracy.

Applications

Applications for the embodiments described in this disclosure are numerous and span many fields. The examples provided below are intended to provide a small picture of the utility of these embodiments in the construction industry. The first two examples, in particular, are general functions which are performed in innumerable tasks each day by construction workers.

1. Turning Angles

The embodiments described herein allow a field worker to turn an angle with relative ease, using only a single transmitter and a single receiver, and requiring only one person to make the measurements. As an example, the transmitter can be set-up and leveled and backsighted on a proposed corner of a room. The worker can then use the azimuth determining capability to determine the lines for the walls coming out of that corner. A distance measuring device would be necessary if the precise corner is to marked 2. Leveling a Floor A single field worker can mark out a series of level points by using the elevation feature of the embodiments described. Of course, the worker can also mark out a series of points along any elevation angle.

Industrial Application

As will be clear from the foregoing disclosure, the present improvements and inventions can be applied to a wide variety of different commercial and industrial fields, applications, industries and technologies. Some of these industrial applications include, without limitation, filmmaking, digital modeling, construction trades, power tools, surveying, construction measurement and layout, law enforcement for accident scene mapping, incident reconstruction, video games, virtual reality, manufacturing, factory automation, manufacturing measurement, etc.

The preferred embodiments were chosen and described in order to best explain the principles of applicants' improvements and inventions and their many practical applications. The preceding description is intended to enable others to best utilize the disclosed improvements and inventions in various embodiments and with various modifications as might be suited to the particular use contemplated. It is intended that the scope of applicants' improvements and inventions be defined by the following claims.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of determining an elevation angle, the method comprising:

receiving a first position strike and a second position strike;

determining a first time separation between receiving the first position strike and the second position strike;

determining two possible elevation angles from the first time separation; and determining which of said two possible elevation angles is the elevation angle.

2. The method of claim 1, wherein the first position strike comprises at least one of a laser strike, a radio frequency signal strike, or an infra-red signal strike, and the second position strike comprises at least one of a laser strike, a radio frequency signal strike, or an infra-red signal strike.

3. The method of claim 1, wherein the first position strike comprises a first laser strike, and the second position strike comprises a second laser strike.

4. The method of claim 3, wherein the first laser strike is produced from a first laser beam, and the second laser strike is produced from a second laser beam.

5. The method of claim 3, wherein the first laser strike is produced by a first portion of a laser beam, the second laser strike is produced by a second portion of the laser beam, and a slant angle of the first portion is not equal to a slant angle of the second portion.

6. The method of claim 3, wherein the first laser strike and the second laser strike are produced from at least one laser beam emitted from a transmitter with a known rotation speed, the first time separation varies with elevation angle, and said converting the first time separation into the elevation angle comprises using the known rotation speed of the transmitter to associate the first time separation with the elevation angle.

7. The method of claim 1, wherein determining the first time separation comprises counting time on an internal clock.

8. The method of claim 1, wherein determining the first time separation does not require receiving signals except for the first position strike and the second position strike.

9. The method of claim 1, wherein converting the first time separation into the elevation angle comprises performing a table lookup in a table including a plurality of possible time separations and a converted elevation angle corresponding to each of the plurality of possible time separations.

10. The method of claim 9, wherein converting the first time separation into the elevation angle further comprises interpolating between at least two converted elevation angles.

11. The method of claim 1, wherein converting the first time separation into the elevation angle comprises receiving a third position strike and a fourth position strike;

determining a second time separation between receiving the third position strike and the fourth position strike; and comparing the first time separation and the second time separation to determine which of two elevation angles, which correspond respectively to the first time separation, is the elevation angle.

12. The method of claim 11, wherein
receiving the first position strike and the second position strike is performed with a first receiver at a first location, and
receiving the third position strike and the fourth position strike is performed with the receiver at a second location.

13. The method of claim 11, wherein
receiving the first position strike and the second position strike is performed with a first receiver at a first location,
receiving the third position strike and the fourth position strike is performed with a second receiver at a second location, and
the first receiver and the second receiver are coupled together.

14. The method of claim 1, further comprising determining a distance to a particular point.

15. The method of claim 14, wherein
the first position strike and the second position strike are produced from a transmitter, and
the particular point is either on the transmitter or on a vertical axis extending from the transmitter.

16. The method of claim 3, further comprising:
emitting a first laser beam which produces the first laser strike and the second laser strike.

17. The method of claim 3, further comprising:
emitting a second laser beam which produces the second laser strike.

18. A method of determining an azimuth angle and an elevation angle, the method comprising:
receiving a strobe pulse, a first position strike, and a second position strike;
determining an elevation time separation between receiving the first position strike and the second position strike;
converting the elevation time separation into the elevation angle, which comprises performing a table look-up;
determining an azimuth time separation, which comprises determining time between (i) reception of the strobe pulse and (ii) a midpoint between reception of the first position strike and reception of the second position strike;
determining a relative azimuth angle, which comprises multiplying the azimuth time separation by 2/T, where T is a period of the strobe pulse; and
adjusting the relative azimuth angle to produce the azimuth angle, which comprises adding an offset angle to the relative azimuth angle.

19. An improved robotic theodolite spatial positioning system comprising:
a single rotatably supported transmitter means for propagating a predetermined pattern of shaped electromagnetic beams,
receiver means for receiving a first position strike and a second position strike of said beams,
first tracking means for detecting a first time interval separation between receiving said first position strike and said second position strike, and
calculating means for converting said first time separation interval into two possible elevation angles and determining which represents actual elevation angle data.

20. The improved spatial positioning system of claim 19 wherein said single transmitter means propagates at least one of a laser beam, a radio frequency signal beam or an infra-red signal beam.

21. The improved spatial positioning system of claim 19 wherein said calculating means comprises logic means responsive to a known rotational speed of said transmitter means for converting said first separation time interval into said elevation angle data.

22. The improved spatial positioning system of claim 19 additionally comprising:
second tracking means for receiving a third position strike and a fourth position strike and for determining a second time separation interval between receiving said third position strike and said fourth position strike, and
means for comparing said first time separation interval and said second time separation interval to determine said elevation angle data.

23. The improved spatial positioning system of claim 19 for determining an azimuth angle further comprising:
strobe means operatively associated with said single transmitter means for periodically emitting a strobe pulse,
means for receiving said strobe pulse,
strobe tracker means for determining a time separation interval related to reception of a strobe pulse and a position strike, and
calculating means for converting said time separation interval between a strobe pulse and a position strike into azimuth angle data.

24. An improved robotic theodolite spatial positioning system for determining an azimuth angle and an elevation angle within a predetermined measurement field comprising:
a single rotatably supported transmitter for propagating a predetermined pattern of electromagnetic strike means and at least one strobe pulse within said measurement field,
receiver means positioned in said measurement field for receiving said strobe pulse,
a first position strike and a second position strike,
first tracker means for determining an elevation time separation interval between said receiver means receiving said first position strike and said second position strike,
converter means for converting said elevation time separation interval into elevation angle data,
second tracker means for determining an azimuth time interval as a function of a time interval relative to receipt of said strobe pulse and a predetermined time between reception of said first position strike and reception of said second position strike, and
calculation means for determining said azimuth angle data as a function of the periodicity of receipt of said strobe pulse.

25. The improved spatial positioning system of claim 24 wherein said calculation means includes logic means for determining a relative azimuth angle data by multiplying said azimuth time separation by 2/T, where T is the strike pulse period.

26. The improved spatial positioning system of claim 25 additionally including logic means to adjust said relative azimuth angle data by adding a predetermined angle offset to said azimuth angle data.

\* \* \* \* \*